(12) United States Patent
Adeeb et al.

(10) Patent No.: US 10,746,200 B1
(45) Date of Patent: Aug. 18, 2020

(54) MODULAR HYDRAULIC VALVE ASSEMBLY FOR WORK VEHICLE

(71) Applicant: Caterpillar SARL, Geneva (CH)

(72) Inventors: Adam Adeeb, Seaham (GB); Steven Johnson, Metamora, IL (US)

(73) Assignee: Caterpillar SARL, Geneva (CH)

( * ) Notice: Subject to any disclaimer, the term of this patent is extended or adjusted under 35 U.S.C. 154(b) by 0 days.

(21) Appl. No.: 16/574,117

(22) Filed: Sep. 18, 2019

(51) Int. Cl.
| | | |
|---|---|---|
| F15B 13/08 | (2006.01) | |
| E02F 9/22 | (2006.01) | |
| F15B 13/06 | (2006.01) | |
| F15B 11/16 | (2006.01) | |
| F15B 11/17 | (2006.01) | |
| F01P 7/04 | (2006.01) | |
| B60W 10/20 | (2006.01) | |
| B60W 10/188 | (2012.01) | |
| B60W 10/30 | (2006.01) | |
| B60T 13/14 | (2006.01) | |
| B62D 5/07 | (2006.01) | |
| F15B 21/0423 | (2019.01) | |

(52) U.S. Cl.
CPC ........ *F15B 13/0817* (2013.01); *E02F 9/2267* (2013.01); *F15B 13/06* (2013.01); *B60T 13/14* (2013.01); *B60W 10/188* (2013.01); *B60W 10/20* (2013.01); *B60W 10/30* (2013.01); *B62D 5/075* (2013.01); *E02F 9/225* (2013.01); *E02F 9/226* (2013.01); *E02F 9/2239* (2013.01); *E02F 9/2292* (2013.01); *E02F 9/2296* (2013.01); *F01P 7/044* (2013.01); *F15B 11/162* (2013.01); *F15B 11/17* (2013.01); *F15B 13/0807* (2013.01); *F15B 13/0821* (2013.01); *F15B 13/0896* (2013.01); *F15B 21/0423* (2019.01); *F15B 2211/20576* (2013.01); *F15B 2211/30595* (2013.01); *F15B 2211/62* (2013.01); *F15B 2211/625* (2013.01); *F15B 2211/7053* (2013.01); *F15B 2211/7058* (2013.01); *F15B 2211/7142* (2013.01); *F15B 2211/781* (2013.01)

(58) Field of Classification Search
CPC ...... E02F 9/2267; F01P 7/044; F15B 21/0423
See application file for complete search history.

(56) References Cited

U.S. PATENT DOCUMENTS

| | | | |
|---|---|---|---|
| 5,875,630 A * | 3/1999 | Walsh | B62D 5/07 60/421 |
| 6,073,536 A | 6/2000 | Campbell | |
| 6,325,170 B2 | 12/2001 | Christensen et al. | |
| 6,848,255 B2 * | 2/2005 | Chiaramonte | F01P 7/044 60/456 |

(Continued)

FOREIGN PATENT DOCUMENTS

CN    107044462    8/2017

*Primary Examiner* — F Daniel Lopez
*Assistant Examiner* — Michael Quandt

(57) ABSTRACT

A hydraulic valve assembly for a work vehicle includes a fan and brake function module. A first pump supplies hydraulic pressure to a fan circuit and to first and second service brake circuits of the vehicle. A second pump supplies hydraulic pressure to a steering and work function module that in turn supplies hydraulic pressure to a steering circuit and a work function circuit of the vehicle. The hydraulic valve assembly may also include a work control module and an auxiliary module. The modules of the hydraulic valve assembly are separably connected together via interface surfaces.

11 Claims, 11 Drawing Sheets

(56) References Cited

U.S. PATENT DOCUMENTS

| | | | |
|---|---|---|---|
| 8,983,741 B2* | 3/2015 | Park | E02F 9/2296 |
| | | | 701/50 |
| 9,239,085 B2* | 1/2016 | Nelson | F16D 31/00 |
| 9,494,171 B2* | 11/2016 | Kobayashi | F15B 13/0842 |
| 9,650,759 B2 | 5/2017 | Dolan | |
| 9,677,572 B2* | 6/2017 | Knussman | F15B 1/024 |
| 2005/0139274 A1 | 6/2005 | Patel | |
| 2016/0317956 A1 | 11/2016 | Schneider | |
| 2017/0146036 A1 | 5/2017 | Boehler et al. | |
| 2018/0087540 A1 | 3/2018 | Cadman | |

* cited by examiner

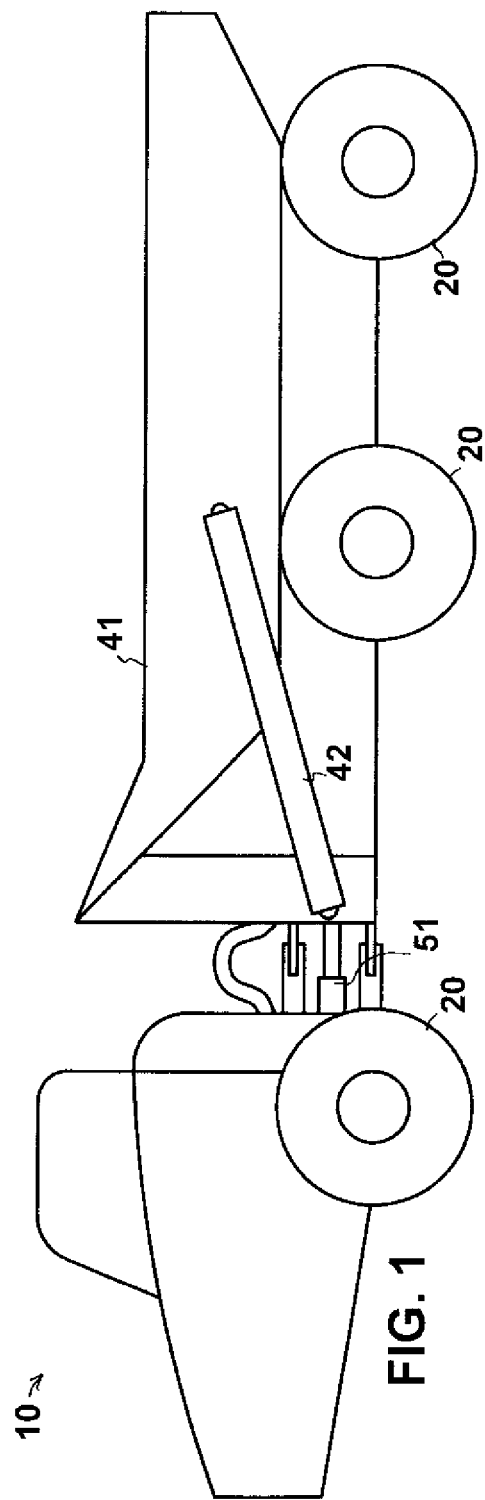
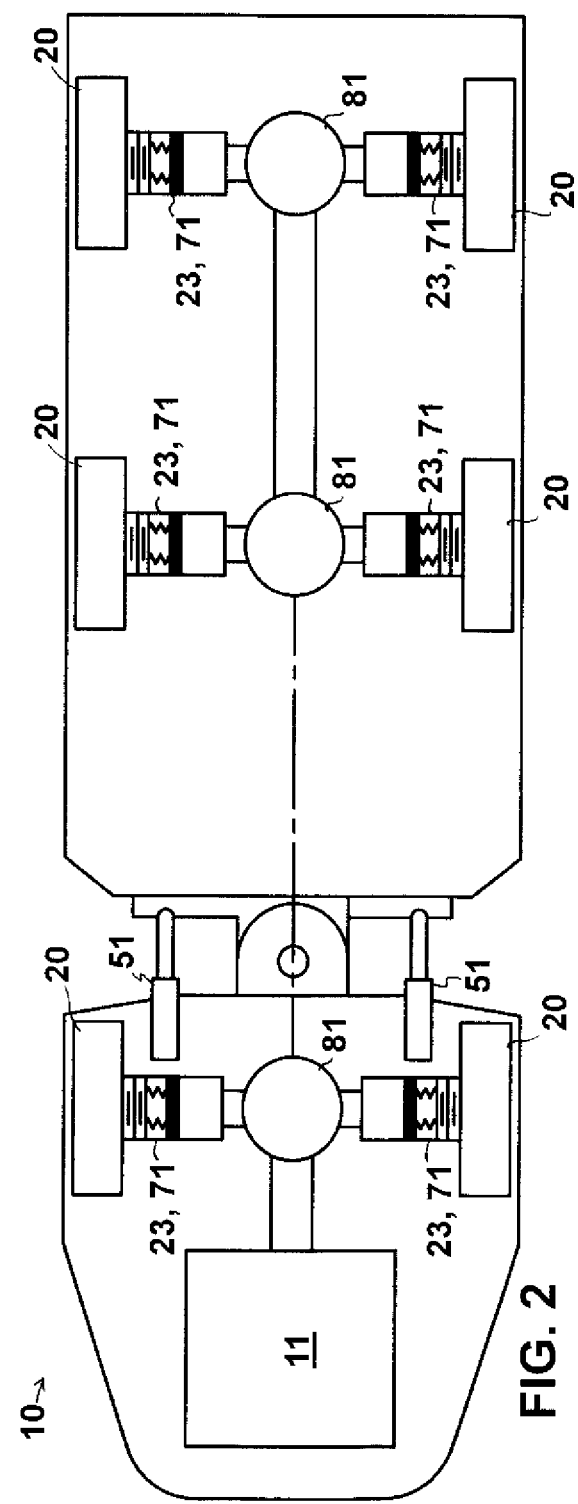
FIG. 1
FIG. 2

MODULAR HYDRAULIC VALVE ASSEMBLY FOR WORK VEHICLE

BACKGROUND

This disclosure relates to modular valve assemblies for supplying hydraulic pressure to operate steering, service brakes, a cooling fan, and other functional hydraulic units of a vehicle, including hydraulically operated equipment of the vehicle, for example, a tipping body, for carrying out a work function of the vehicle, and the like.

It is known to provide an articulated dump truck with a main valve assembly formed as a unitary valve block with multiple hydraulic circuits for supplying hydraulic pressure to operate the steering, service brakes and cooling fan, and having hydraulic lines to supply pressure to a second valve assembly located elsewhere on the vehicle. The second valve assembly is configured to control the tipping body or other work equipment of the vehicle responsive to operator commands received at the second valve block.

In such arrangements, it is known to supply pressure to the main valve assembly from two or more pumps, wherein a first one of the pumps supplies the service brake and cooling fan circuits, and a second one of the pumps supplies the steering circuit. A third pump may provide a redundant supply to the steering circuit in parallel with the second pump. The use of two or three separate pumps instead of a single, larger pump makes it easier to fit the pumps into the available space on the chassis of the vehicle, and ensures that adequate flow is available to operate both the service brake and fan circuit and the steering circuit simultaneously at peak demand.

A tipping body or other work equipment of the vehicle will typically be operated when the vehicle is stationary so that the brake and steering functions are not in use, and may require high power or a high flow rate for satisfactory operation when the vehicle is fully loaded. Accordingly, it is known to configure the main valve assembly to combine the supply from both the first and second pumps to power the work equipment via priority valves which prioritise flow to the steering, service brake and fan circuits when required.

It is also known to configure the main valve assembly to supply pressure from the first pump to auxiliary circuits which supply pressure to actuate parking brakes and differential locks of the vehicle. The known main valve assembly is large and complex and is difficult to adapt for use in different vehicles with different equipment specifications. Moreover, its hydraulic efficiency is limited by machining limitations which impose practical constraints on the configuration of the internal flowpaths of the unitary valve block.

In order to provide a more adaptable arrangement, it is known to build a hydraulic valve assembly from modular blocks. By way of example, U.S. Pat. No. 6,325,170 discloses a modular valve assembly supplied from a hydraulic pump. And U.S. Patent Pun. No. 2016/0317956 A1 discloses a tracked mining shovel having a modular valve assembly supplying a plurality of hydraulic circuits from a plurality of hydraulic pumps. The valve assembly includes filter modules, junction modules for combining the flow via two of the filter modules from two of the pumps, and valve modules operable to direct the flow from the junction modules, selectively to actuate either or both of the shovel and the tracks.

SUMMARY

In accordance with some embodiments of the present disclosure, a hydraulic valve assembly is provided that comprises a plurality of hydraulic modules that are seperably connected to one another to provide that the hydraulic valve assembly can be customized to the vehicle. In addition, in some embodiments, hydraulic modules may be used interchangeably in different vehicles. In some embodiments, including the modules in a centralized hydraulic valve assembly provides that the modules do not have to be distributed through the machine. In some embodiments, the modules may be configured to operate independently of the other modules in the hydraulic valve assembly.

In accordance with the present disclosure there is provided a hydraulic valve assembly for use in a vehicle. The vehicle includes a plurality of wheels, a cooling fan, an equipment for carrying out a work function of the vehicle, a plurality of hydraulic circuits, and first and second hydraulic pumps for supplying hydraulic pressure to the hydraulic circuits.

The hydraulic circuits include first and second service brake circuits, each service brake circuit including at least one respective service brake actuator for braking the wheels, a fan circuit including a fan actuator for operating the cooling fan, a steering circuit including at least one steering actuator for steering the wheels, and a work function circuit including at least one equipment actuator for operating the equipment.

The valve assembly includes a fan and brake function module configured to control a supply of hydraulic pressure to the fan circuit and the service brake circuits, and a steering and work function module configured to control a supply of hydraulic pressure to the steering circuit and the work function circuit.

The fan and brake function module includes a first pump inlet for receiving a supply of hydraulic pressure from the first pump, first and second service brake outlets for supplying hydraulic pressure to the first and second service brake circuits, and a fan supply outlet for supplying hydraulic pressure to the fan circuit.

The steering and work function module includes a second pump inlet for receiving a supply of hydraulic pressure from the second pump, a steering supply outlet for supplying hydraulic pressure to the steering circuit of the vehicle, and a work function outlet for supplying hydraulic pressure to the work function circuit of the vehicle.

The fan and brake function module has a first interface surface and a plurality of first ports opening through the first interface surface, and the steering and work function module has a second interface surface and a plurality of second ports opening through the second interface surface.

The fan and brake function module and the steering and work function module are separable at the first and second interface surfaces, and are connectable together at the first and second interface surfaces in a connected configuration in which each of the first ports is in fluid communication with a respective one of the second ports.

BRIEF DESCRIPTION OF THE DRAWINGS

Further features and advantages will be apparent from the following illustrative embodiment which will now be described, purely by way of example and without limitation to the scope of the claims, and with reference to the accompanying drawings, in which:

FIGS. 1 and 2 are respectively a side view and a schematic plan view of a vehicle;

Reference numerals and characters appearing in more than one of the figures indicate the same or corresponding elements in each of them.

DESCRIPTION

Figure 3:
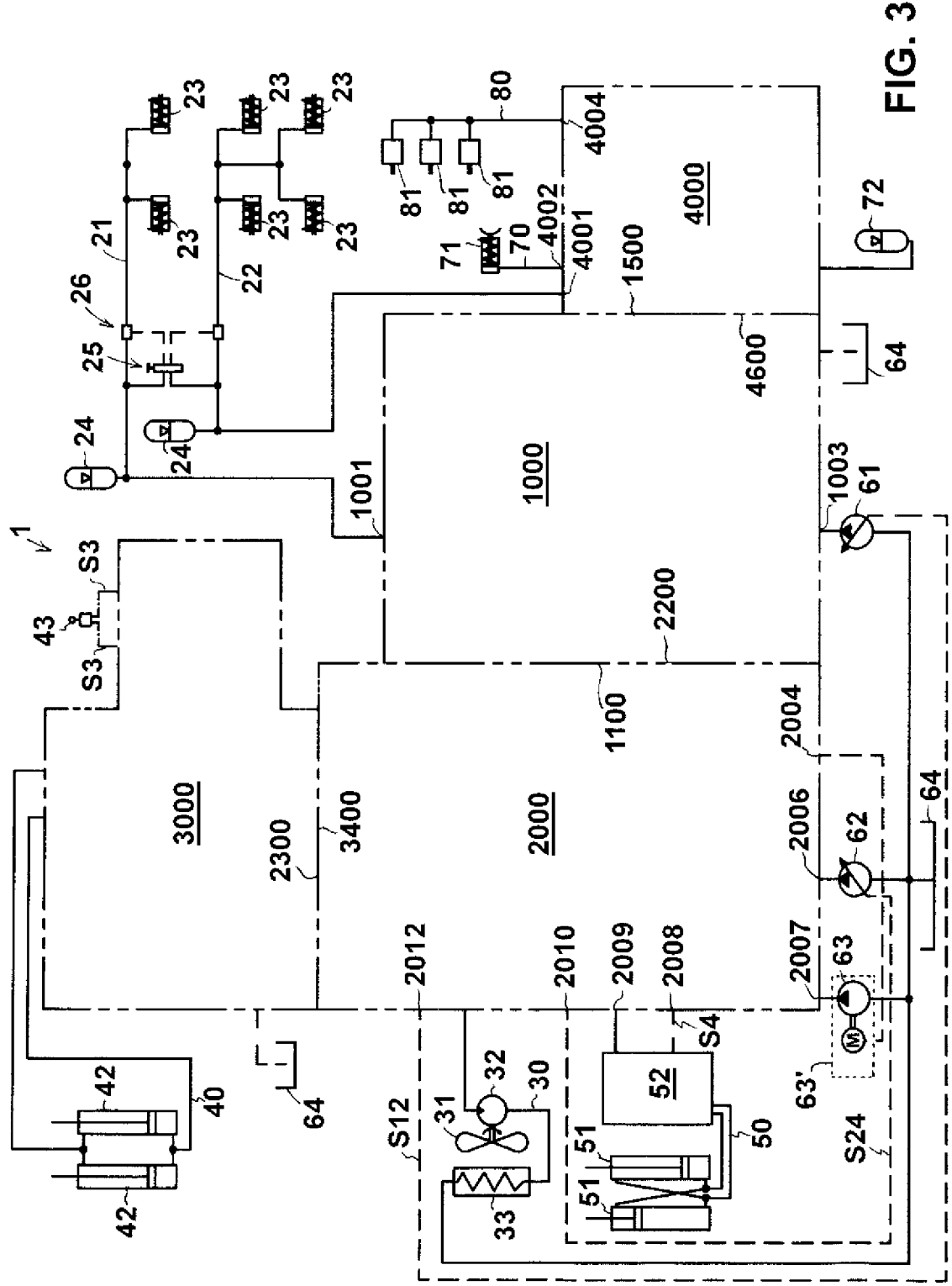
FIG. 3 shows various functional elements of the vehicle including a valve assembly comprising four valve modules shown in outline.

A hydraulic valve assembly for a work vehicle includes a fan and brake function module. A first pump supplies hydraulic pressure to a fan circuit and to first and second service brake circuits of the vehicle. A second pump supplies hydraulic pressure to a steering and work function module that in turn supplies hydraulic pressure to a steering circuit and a work function circuit of the vehicle. The hydraulic valve assembly may also include a work control module and an auxiliary module. The modules of the hydraulic valve assembly are separably connected together via interface surfaces.

Referring to FIGS. 1-4, a vehicle 10 includes a plurality of wheels 20, a cooling fan 31, an equipment 41 for carrying out a work function of the vehicle, a plurality of hydraulic circuits 21, 22, 30, 40, 50, 70, 80, and first and second hydraulic pumps 61, 62, optionally also a third hydraulic pump 63, for supplying hydraulic pressure to the hydraulic circuits. The third pump 63 may be driven by a different prime mover from the other pumps, for example, by a motor M. A tank or tanks 64 may be arranged to hold the hydraulic fluid.

In this specification, unless the context suggests otherwise, hydraulic pressure is understood to refer to pressure or both pressure and flow of hydraulic fluid, depending on the application—for example, pressure with little or no flow may be used as a signal to control hydraulic valves, while both pressure and substantial flow may be required to operate the work equipment of the vehicle.

The hydraulic circuits include first and second service brake circuits 21, 22, a fan circuit 30, a work function circuit 40, and a steering circuit 50, and may further include a parking brake circuit 70 and a differential lock circuit 80.

Each service brake circuit 21, 22 includes at least one respective service brake actuator 23 for braking the wheels 20, and may also include a respective hydraulic accumulator 24. The first and second service brake circuits 21, 22 may be operable by a user control, e.g. a pedal 25, and optionally also by an automatic retarding system 26. In the illustrated embodiment, the vehicle 10 is an articulated truck, and the first and second service brake circuits act respectively on the two front wheels of the tractor unit and the four rear wheels of the trailer unit.

The fan circuit 30 includes a fan actuator 32 for operating the cooling fan 31, and optionally also a heat exchanger 33 which may be configured as an oil cooler from which heat is extracted to the cooling airflow from the fan. The fan 31 may also (or alternatively) extract heat from the coolant circuit of the engine 11 of the vehicle.

The steering circuit 50 includes at least one steering actuator 51 for steering the wheels 20, for example, responsive to user input via steering controls 52. In the illustrated embodiment there are two steering actuators 51 which rotate the tractor unit including the front wheels about its coupling to the trailer unit; other steering arrangements of course are possible.

The work function circuit 40 includes at least one equipment actuator 42 for operating the equipment 41. In the illustrated embodiment the equipment 41 is a tipping body of the vehicle, and the equipment actuator 42 includes one or more hydraulic rams for raising and lowering the tipping body. In alternative embodiments the work equipment could be, for example, a bucket or grab or other operable tool mounted on the vehicle.

The parking brake circuit 70 includes one or more parking brake actuators 71 for applying the parking brakes to brake the wheels 20. The differential lock circuit 80 includes one or more differential lock actuators 81 for selectively locking the differential at one or more points in the vehicle transmission responsive to a differential lock control input (not shown).

The vehicle may include a work function control signal generator 43 operable by a user to generate a work function control signal S3 to control the equipment. The work function control signal may be for example an electrical signal or a hydraulic pressure signal. In the illustrated embodiment, the work function control signal S3 is an electrical signal for raising and lowering the tipping body.

The vehicle includes a hydraulic valve assembly 1 for controlling the hydraulic pressure (which is to say, hydraulic pressure and flow of hydraulic fluid) supplied to the various hydraulic circuits. The valve assembly 1 includes a fan and brake function module 1000 and a steering and work function module 2000.

The fan and brake function module 1000 is configured to control a supply of hydraulic pressure to the fan circuit 30 and the service brake circuits 21, 22, and includes a first pump inlet 1003 for receiving a supply of hydraulic pressure from the first pump 61, first and second service brake outlets 1001, 1501 for supplying hydraulic pressure from the first pump inlet 1003 to the first and second service brake circuits 21, 22, and a fan supply outlet 1102 for supplying hydraulic pressure from the first pump inlet 1003 to the fan circuit 30.

The steering and work function module 2000 is configured to control a supply of hydraulic pressure to the steering circuit 50 and the work function circuit 40, and includes a second pump inlet 2006 for receiving a supply of hydraulic pressure from the second pump 62, a steering supply outlet 2009 for supplying hydraulic pressure to the steering circuit 50 of the vehicle, and a work function outlet 2301 for supplying hydraulic pressure to the work function circuit 40 of the vehicle.

Figure 4:
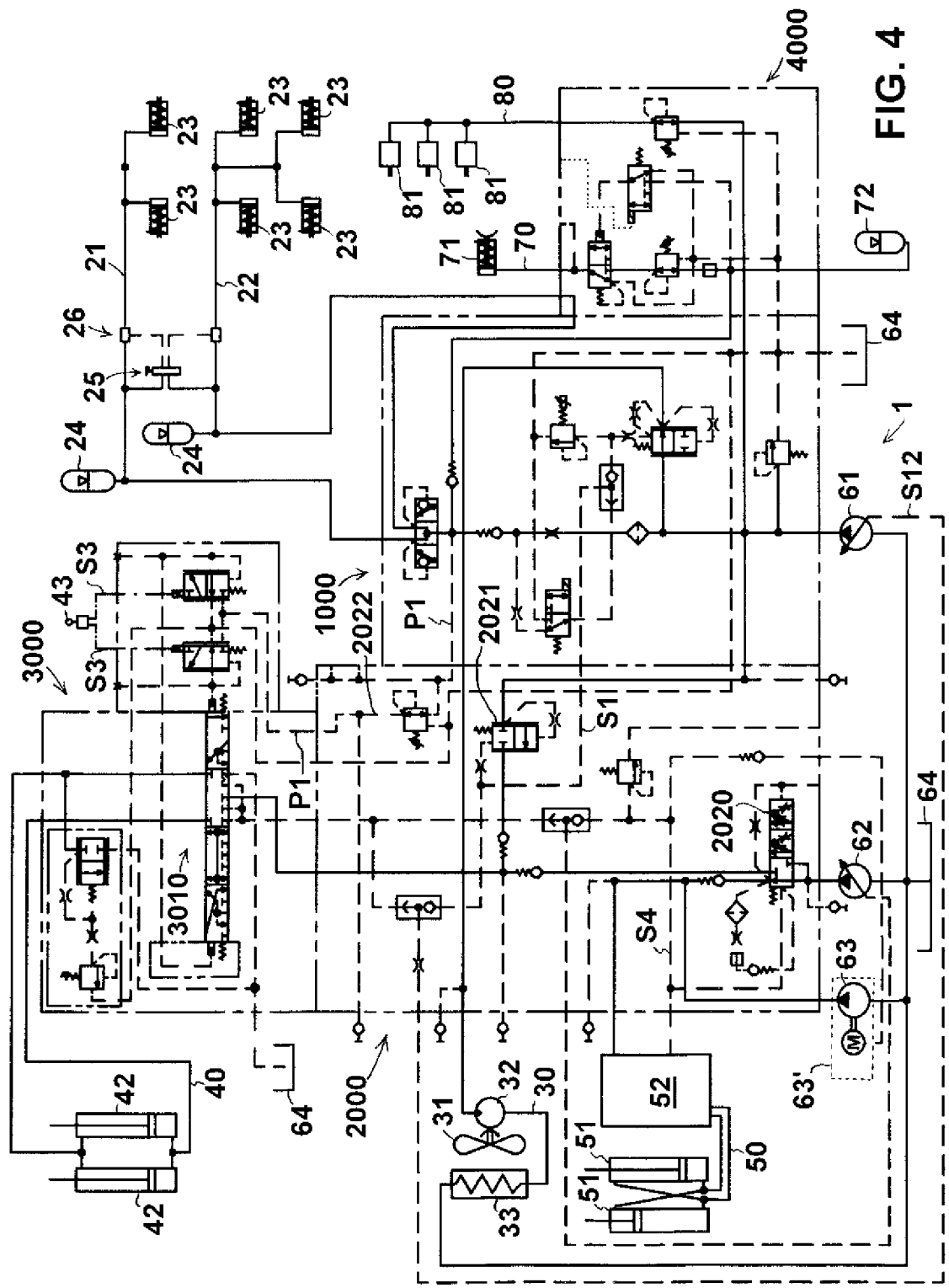
FIG. 4 is a more detailed schematic drawing of the functional elements show in FIG. 3, including the internal components of the four valve modules.
Figure 5:
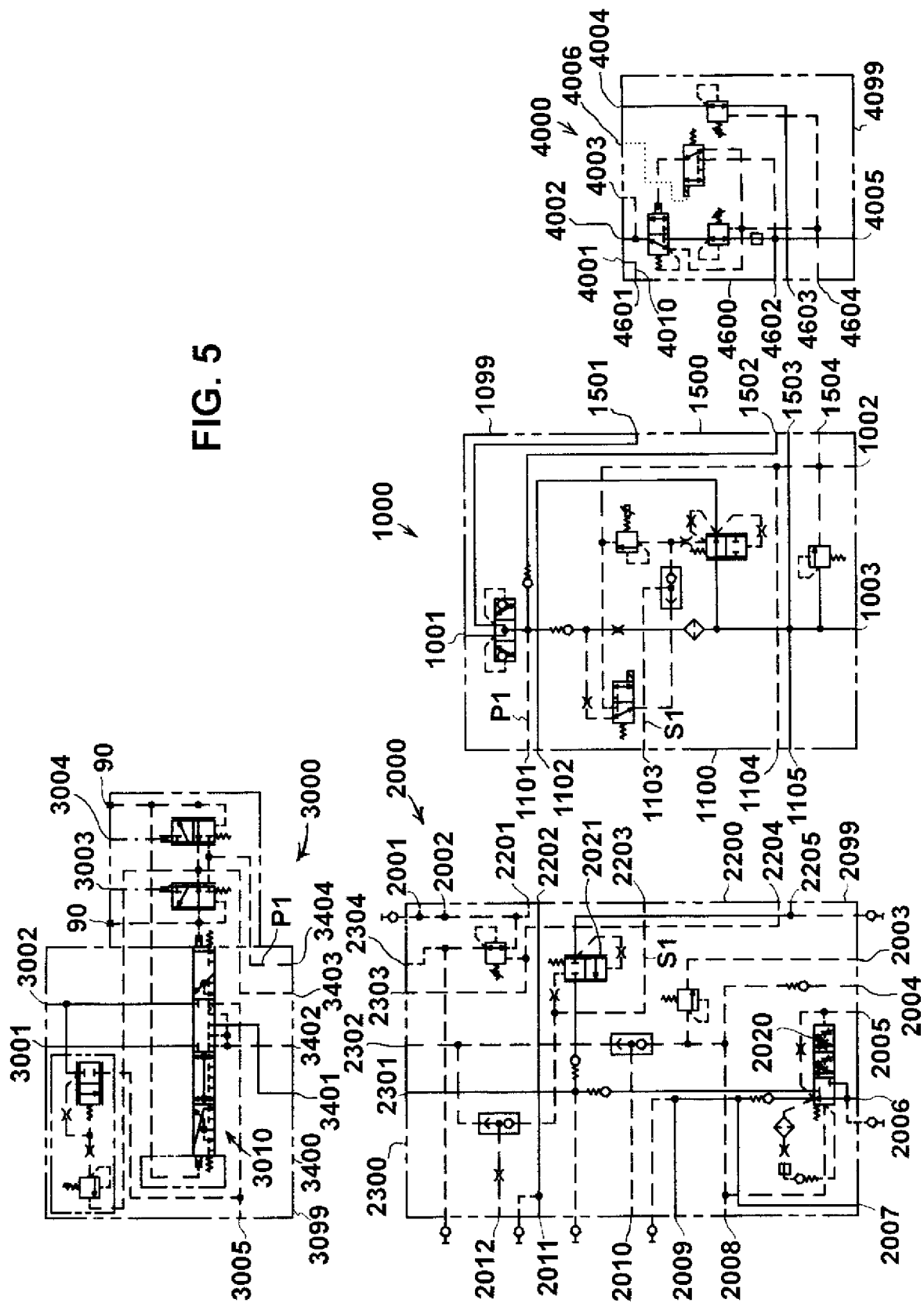
FIG. 5 shows the four valve modules separated from each other.

Referring also to FIG. 5, the fan and brake function module 1000 has a first interface surface 1100 and a plurality of first ports 1101, 1102, 1103, 1104, 1105 opening through the first interface surface 1100. The steering and work function module 2000 has a second interface surface 2200 and a plurality of second ports 2201, 2202, 2203, 2204, 2205 opening through the second interface surface 2200. The fan and brake function module 1000 and the steering and work function module 2000 are separable at the first and second interface surfaces 1100, 2200 as shown in FIG. 5, and are connectable together at the first and second interface surfaces 1100, 2200 in a connected configuration as shown in FIGS. 3 and 4, in which each of the first ports 1101, 1102, 1103, 1104, 1105 is in fluid communication with a respective one of the second ports 2201, 2202, 2203, 2204, 2205.

Optionally, the valve assembly may further include one or both of a work control module 3000 and an auxiliary module 4000, as further described below. Each module 1000, 2000, 3000, 4000 may include a plurality of valves arranged in or mounted on a respective valve block 1099, 2099, 3099, 4099. The valve block of each module may comprise internal flowpaths formed by casting, which permits a relatively more intricate configuration than can be achieved with machining and so can result in better hydraulic efficiency and so better performance of the valves which are in fluid communication via the flowpaths. For example, each of valve blocks 1099, 2099, 3099 may be formed by casting. Alternatively, some or all of the valve blocks may be formed by machining, e.g. from solid bar stock, as further explained below. For example, valve block 4099 may be formed by machining while at least one and, optionally, both of valve blocks 1099 and 2099, and optionally also valve block 3099, are formed by casting.

The valves of each module are configured to control the hydraulic pressure or flow delivered from the respective pump or pumps to the respective hydraulic circuit or circuits supplied by the respective module to suit the functional requirements of the circuit or circuits; thus, each module has a different configuration of multiple, functionally interconnected hydraulic valves as further explained below.

Figure 7:
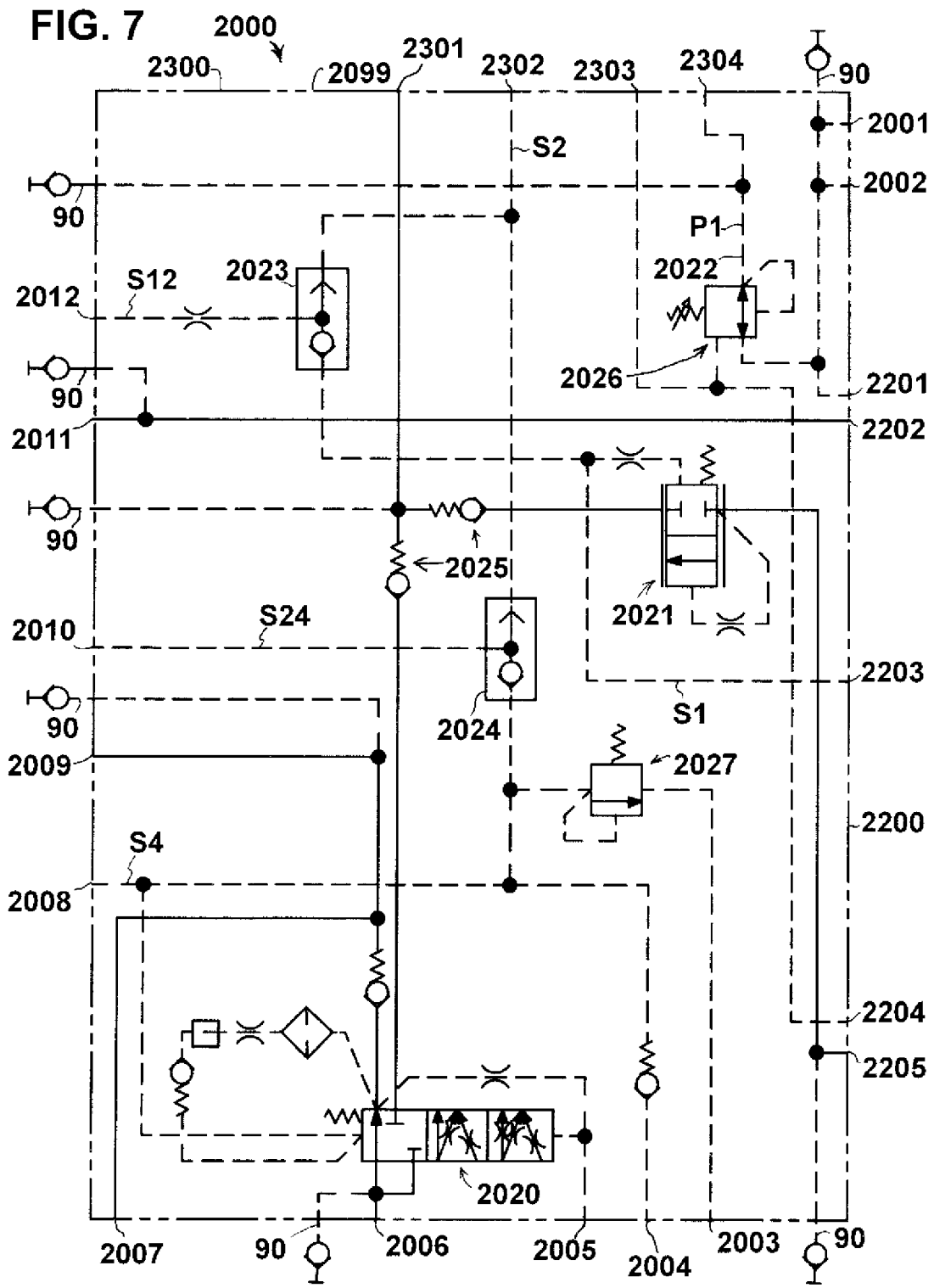
FIG. 7 shows the steering and work function module of the valve assembly.

Referring also to FIG. 7, the steering and work function module 2000 may include a steering function priority valve 2020 which is configured to restrict the supply of hydraulic pressure from the second pump 62 to the work function outlet 2301, so as to maintain the supply of hydraulic pressure from the second pump 62 to the steering supply outlet 2009, responsive to increasing load on the steering circuit 50.

The steering function priority valve 2020 may be operable by a steering load sensing pressure signal S4 generated (which is to say, outputted) by the steering circuit 50 and applied to a steering load sensing pressure signal port 2008 in the steering and work function module 2000.

In order to ensure adequate hydraulic flow to the work function circuit 40, the steering and work function module 2000 may be configured to control a supply of hydraulic pressure from both of the first and second pumps 61, 62 to the work function outlet 2301. The steering and work function module 2000 may further include a fan and brake function priority valve 2021 which is configured to restrict the supply of hydraulic pressure from the first pump 61 to the work function outlet 2301, so as to maintain the supply of hydraulic pressure from the first pump 61 to the first and second service brake outlets 1001, 1501 and the fan supply outlet 1102, responsive to increasing load on any of the fan circuit 30 and the first and second service brake circuits 21, 22.

For this purpose, the first and second ports may include first and second work function supply ports 1105, 2205 configured in fluid communication in the connected configuration to convey the hydraulic pressure from the first pump inlet 1003 of the fan and brake function module 1000 to the fan and brake function priority valve 2021 of the steering and work function module 2000.

The steering and work function module 2000 may further include two check valves 2025 through each of which the flow of hydraulic fluid passes from a respective one of the first and second pumps 61, 62. The flow from the two pumps is combined downstream of the two check valves, which ensure that each pump supplies only its respective circuits, and then the combined flow is directed to the work function outlet 2301.

The steering and work function module 2000 may further include a third pump inlet 2007 for receiving a supply of hydraulic pressure from a third pump 63, which is combined with the pressure supplied by the second pump 62 as a secondary supply to the steering circuit 50. The third pump 63 may be driven by a motor M. The motor M may be controlled by a pressure sensor (not shown) connected to port 2005, which may start the motor M when pressure supplied by the second pump 62 to the steering circuit 50 drops below a threshold pressure value.

A control system 63' of the third pump 63 may be coupled to the steering load sensing pressure signal S4 via port 2004 to control the output of the third pump 63 while it is in operation. For example, pressure supplied by the third pump 63 may be applied to port 2004 which relieves the applied pressure proportionately to the load sensing pressure signal S4. The control system 63' may be operable responsive to the remaining, applied pressure upstream of port 2004 which is thus proportionate to the load sensing pressure signal S4. The control system 63' may include a bypass valve (not shown) which is operable by the remaining, applied pressure to selectively relieve pressure across the pump 63 so as to adjust its output pressure and flow proportionately to the load sensing pressure signal S4.

The steering and work function module 2000 may further include a steering load sensing relief valve 2027 for relieving excess pressure from the steering load sensing system to tank 64 via port 2003 to limit the steering load sensing pressure signal S4.

Figure 6:
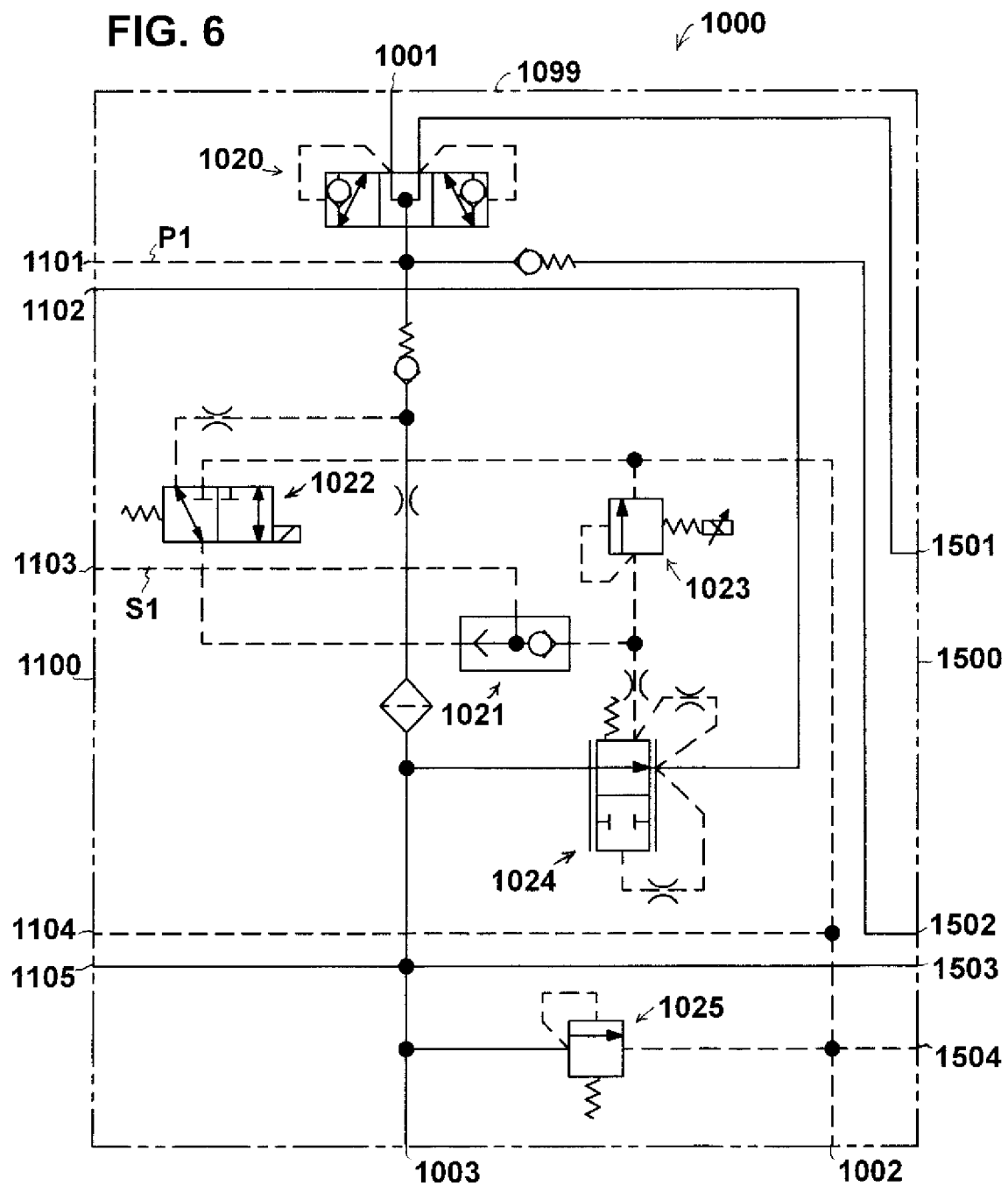
FIG. 6 shows the fan and brake function module of the valve assembly.

Referring also to FIG. 6, the fan supply outlet 1102 may communicate in the connected configuration with port 2202 of the steering and work function module 2000. Port 2202 may be connected via a flowpath in the steering and work function module 2000 to another port 2011 on an exposed face of the steering and work function module 2000 which provides a convenient point to connect the pressure supplied from the first pump 61 to the fan circuit 30.

The fan and brake function module 1000 may be configured to generate (which is to say, output) a first load sensing pressure signal S1 indicative of variations in load on the fan circuit 30 and the first and second service brake circuits 21, 22. The first and second ports may include first and second load sensing pressure signal ports 1103, 2203 which are configured in fluid communication in the connected configuration to convey the first load sensing pressure signal S1 from the fan and brake function module 1000 to the fan and brake function priority valve 2021 of the steering and work function module 2000. The fan and brake function priority valve 2021 may be operable responsive to the first load sensing pressure signal S1 to restrict the supply of hydraulic pressure from the first pump 61 to the work function outlet 2301 so as to maintain the supply of hydraulic pressure from the first pump 61 to the first and second service brake outlets 1001, 1501 and the fan supply outlet 1102.

The fan and brake function module 1000 may include a pressure relief valve 1025 configured to relieve excess pressure supplied from the first pump 61 to the first and second service brake outlets 1001, 1501.

The fan and brake function module 1000 may include a service brake supply valve assembly configured to control the supply of pressure from the first pump inlet 1003 to each of the first and second service brake outlets 1001, 1501, and a fan supply valve assembly configured to control the supply of pressure from the first pump inlet 1003 to the fan supply outlet 1102.

The service brake supply valve assembly may include a brake circuit protection valve 1020 which receives a flow of hydraulic fluid from the first pump 61 and supplies it to both of the first and second service brake outlets 1001, 1501. The brake circuit protection valve 1020 may be operable by pressure signals from the first and second service brake circuits 21, 22, responsive to sensing that one of said circuits 21, 22 is at a higher pressure than the other, to selectively prevent a return flow of hydraulic fluid from the respective service brake circuit which is at a higher pressure.

The fan and brake function module 1000 may include a shuttle valve 1021 which combines or resolves pressure signals from the fan circuit 30 and from the supply from the first pump 61 to the first and second service brake circuits 21, 22 to generate the first load sensing pressure signal S1.

In addition to shuttle valve 1021, the fan and brake function module 1000 may further include a solenoid actuated valve 1022 arranged to modulate the pressure signal from the supply from the first pump 61 to the first and second service brake circuits 21, 22 responsive to an electrical signal (not shown) generated based on sensor output from sensors (not shown) that monitor pressure in the first and second service brake circuits 21, 22. In this way valve 1022 may modulate the first load sensing pressure signal S1 to reflect demand from the first and second service brake circuits 21, 22.

The fan supply valve assembly may include valves 1023, 1024.

Valve 1023 is solenoid actuated and arranged to modulate the pressure signal from the fan circuit 30 responsive to an electrical signal generated based on sensor output from one or more sensors (not shown) that monitor a temperature of the hydraulic fluid and/or engine coolant.

Valve 1024 is arranged to modulate the supply of hydraulic pressure to the fan supply outlet 1102 so as to increase or decrease the speed of the cooling fan 31 responsive to the pressure signal which is received from the fan circuit 30 and modulated by the solenoid actuated valve 1023. In this way valves 1023 and 1024 together may modulate the first load sensing pressure signal S1 to reflect demand from the fan circuit 30.

Figure 8:
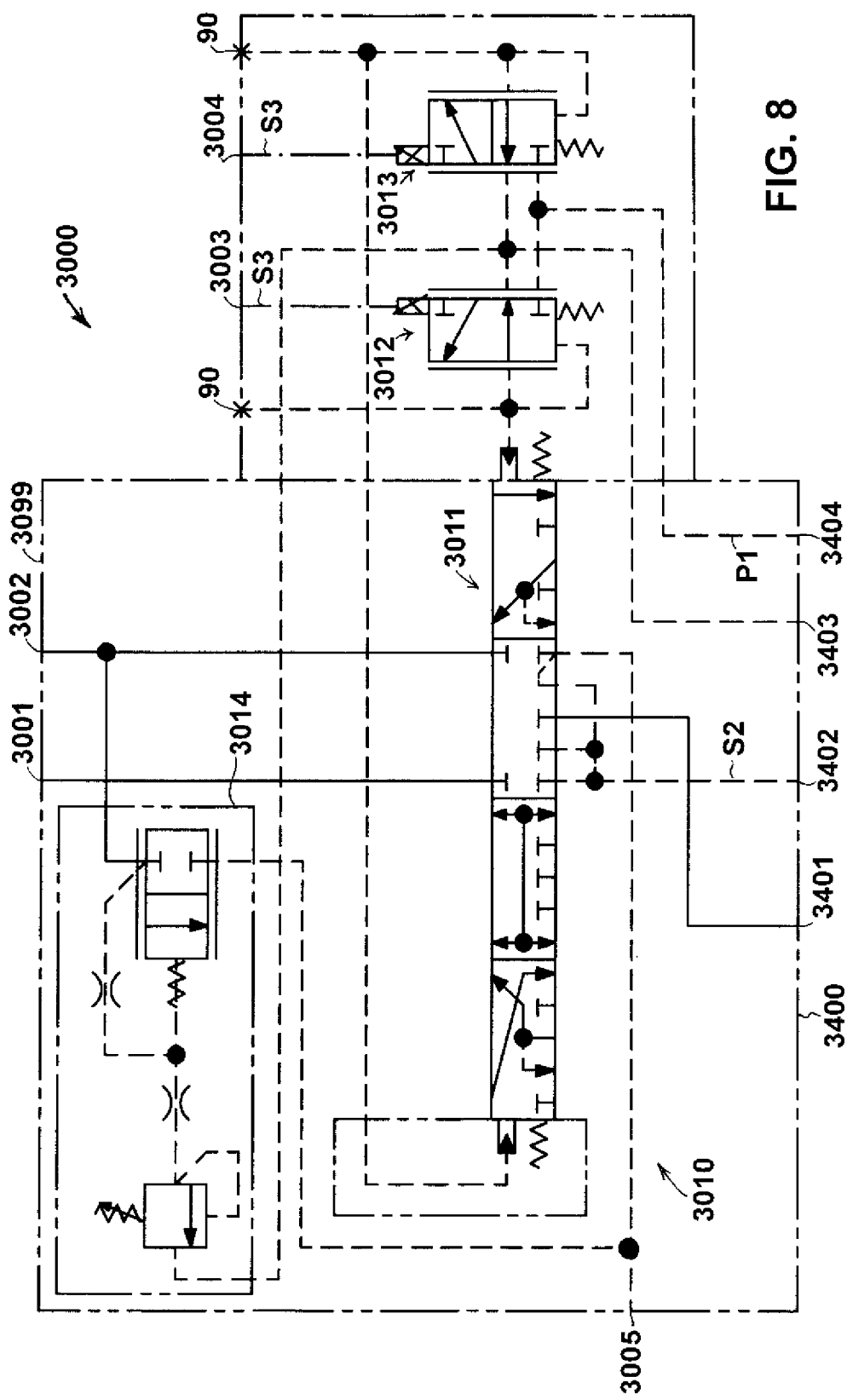
FIG. 8 shows the work control module of the valve assembly.

Referring also to FIG. 8, the valve assembly 1 may further include a work control module 3000 which is configured to control operation of the work function circuit 40.

In order to connect to the work control module 3000, the steering and work function module 2000 may have a third interface surface 2300 and a plurality of third ports 2301, 2302, 2303, 2304 opening through the third interface surface 2300. The work control module 3000 has a fourth interface surface 3400 and a plurality of fourth ports 3401, 3402, 3403, 3404 opening through the fourth interface surface 3400. The steering and work function module 2000 and the work control module 3000 are separable at the third and fourth interface surfaces 2300, 3400 and are connectable together at the third and fourth interface surfaces 2300, 3400 in a connected configuration in which each of the third ports 2301, 2302, 2303, 2304 is in fluid communication with a respective one of the fourth ports 3401, 3402, 3403, 3404.

The work control module 3000 may include a work function control valve assembly 3010 operable by a work function pilot pressure supply P1 responsive to the work function control signal S3 to control the operation of the at least one equipment actuator 42 in the work function circuit 40. For this purpose, a flowpath 2022 may be provided in the steering and work function module 2000 between the second interface surface 2200 and the third interface surface 2300 to convey the work function pilot pressure supply P1 from the fan and brake function module 1000 to the work function control valve assembly 3010 of the work control module 3000.

The fan and brake function module 1000 may be configured to supply hydraulic fluid from the first pump 61 at equal pressure to the first and second service brake outlets 1001, 1501 and to a pilot pressure supply port 1101 in the first interface surface 1100, which communicates with the flowpath 2022 in the connected configuration via a corresponding pilot pressure supply port 2201 in the second interface surface 2200.

The steering and work function module 2000 may include a pilot pressure limit valve 2026 which is configured to limit the pressure of the pilot pressure supply P1 received from port 2201. The pilot pressure supply P1 is supplied to the pilot valves 3012, 3013 via ports 2304, 3404 in the connected configuration.

The work function control valve assembly 3010 may include a spool valve 3011 in fluid communication with the at least one equipment actuator 42 via first and second equipment actuation ports 3001, 3002, and in fluid communication with the combined supply of hydraulic pressure from both of the first and second pumps 61, 62 via port 3401 which communicates with the work function outlet 2301 in the connected configuration. The spool valve 3011 may be operable to operate the at least one equipment actuator 42 by connecting the equipment actuation ports 3001, 3002 selectively to the supply of hydraulic pressure and to tank 64. For example, where the equipment 41 is a tipping body raised and lowered by one or more hydraulic rams 42, ports 3001, 3002 may communicate with opposite sides of the piston, so that pressurising port 3001 acts to raise the vehicle body, and pressurising port 3002 acts to lower the body. The spool valve 3011 may have four positions defining respectively Lower, Float, Hold, and Raise operations as known in the art.

The work function control valve assembly 3010 may further include pilot valves 3012, 3013 operable by the work function control signal S3 received via signal connections 3003, 3004 to selectively apply the work function pilot pressure supply P1 to operate the spool valve 3011. In the illustrated example, valve 3012 commands the spool valve 3011 to raise the vehicle body, and valve 3013 commands the spool valve 3011 to lower the vehicle body.

The work control module 3000 may include a pressure relief valve assembly 3014 configured to relieve to tank 64 excess pressure in the lowering branch of the work function circuit 40 at port 3002.

The work control module 3000 may be configured to generate (which is to say, output) a second load sensing pressure signal S2 indicative of variations in load in the work function circuit 40. In this case, the third and fourth ports may include third and fourth load sensing signal ports 2302, 3402 configured in fluid communication in the connected configuration to convey the second load sensing pressure signal S2 from the work control module 3000 to a first load sensing shuttle valve 2023 which is arranged in the steering and work function module 2000 and which also receives the first load sensing pressure signal S1. The first load sensing shuttle valve 2023 combines or resolves the first and second load sensing pressure signals S1, S2 to produce a combined pressure signal S12. The combined pressure signal S12 may be applied to the first pump 61 via a first pump control pressure signal port 2012 in the steering and work function module 2000. The first pump 61 may be controlled by the combined signal S12. For example, the first pump 61 may have a variable flow rate that varies responsive to the combined signal S12.

The steering and work function module 2000 may include a second load sensing shuttle valve 2024 which combines or resolves the steering load sensing pressure signal S4 and the second load sensing pressure signal S2 to produce a combined pressure signal S24. The combined pressure signal S24 may be applied to the second pump 62 via a second pump control pressure signal port 2010 in the steering and work function module 2000. The second pump 62 may be controlled by the combined signal S24. For example, the second pump 62 may have a variable flow rate that varies responsive to the combined signal S24.

Figure 9:
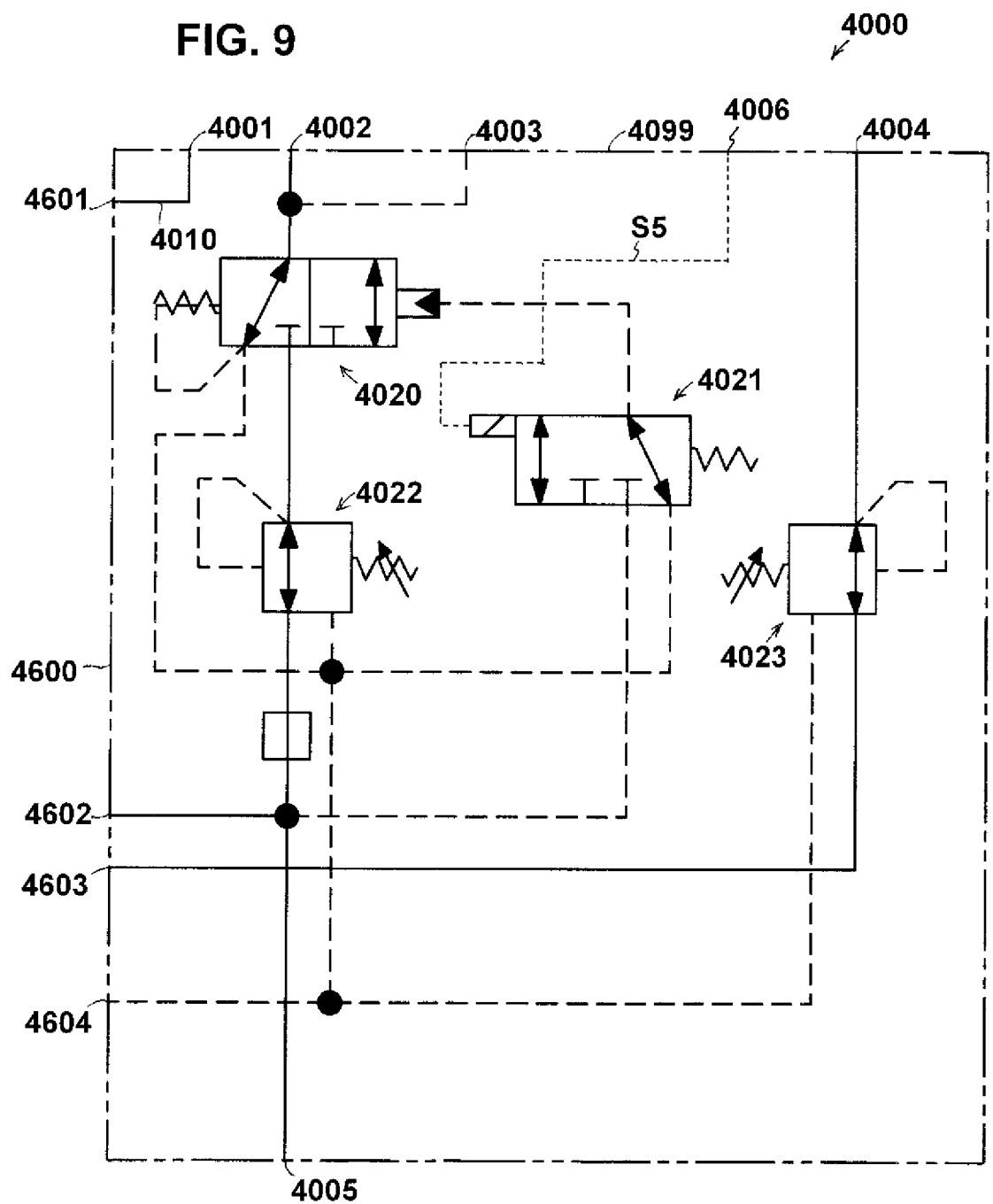
FIG. 9 shows the auxiliary module of the valve assembly.

Referring also to FIG. 9, in addition to the work control module 3000, the valve assembly 1 may further include an auxiliary module 4000 which is configured to control a supply of hydraulic pressure to at least one further hydraulic circuit 70, 80 of the vehicle 10.

The auxiliary module 4000 includes at least one auxiliary supply outlet 4002, 4004 for supplying hydraulic pressure to the at least one further hydraulic circuit 70, 80 of the vehicle 10, and a sixth interface surface 4600 with a plurality of sixth ports 4601, 4602, 4603, 4604 opening through the sixth interface surface.

The fan and brake function module 1000 may include a corresponding, fifth interface surface 1500 and a plurality of fifth ports 1501, 1502, 1503, 1504 opening through the fifth interface surface 1500.

The auxiliary module 4000 and the fan and brake function module 1000 may be separable at the fifth and sixth interface surfaces 1500, 4600, and connectable together at the fifth and sixth interface surfaces 1500, 4600 in a connected configuration in which each of the fifth ports 1501, 1502, 1503, 1504 is in fluid communication with a respective one of the sixth ports 4601, 4602, 4603, 4604.

The fan and brake function module 1000 may be configured to supply pressure from the first pump inlet 1003 to the at least one auxiliary supply outlet 4002, 4004 via respective ones of the fifth and sixth ports in the connected configuration. In the illustrated example, the pressure is supplied via the connected ports 1502, 4602 and auxiliary supply outlet 4002 to the parking brake circuit 70, and via the connected ports 1503, 4603 and auxiliary supply outlet 4004 to the differential lock circuit 80.

Both of the first and fifth interface surfaces 1100, 1500 may be formed on a valve block 1099 of the fan and brake function module 1000, and both of the second and third interface surfaces 2200, 2300 may be formed on a valve block 2099 of the steering and work function module 2000. Similarly, the fourth interface surface 3400 may be formed on a valve block 3099 of the work control module 3000. The or each valve block is formed as a monolithic body with internal flowpaths, a plurality of valves being mounted in recesses formed in the valve block, and/or in housings mounted on the valve block, and fluidly connected together by the internal flowpaths. Flowpaths are indicated generally in the drawings by solid lines for main pressure supply flowpaths, and broken lines for pressure signal flowpaths or return flowpaths to tank.

For improved hydraulic efficiency, at least one, and optionally each, of the valve block 1099 of the fan and brake function module 1000 and the valve block 2099 of the steering and work function module 2000, and optionally also the valve block 3099 of the work control module 3000, may define internal hydraulic flowpaths formed by casting. In this case, where an auxiliary module 4000 is provided, the sixth interface surface 4600 may be formed on a valve block 4099 of the auxiliary module 4000, wherein the valve block 4099 of the auxiliary module 4000 defines internal hydraulic flowpaths formed by machining and not by casting.

Thus, the auxiliary module may be machined, for example, from bar stock to suit the configuration of the particular vehicle 10, while some or all of the remaining modules are cast to define a more complex internal flowpath configuration for optimal hydraulic efficiency.

The auxiliary module 4000 may have a third service brake outlet 4001 for supplying hydraulic pressure to a respective one of the first and second service brake circuits, which in the illustrated embodiment is the second service brake circuit 22. In this case, the corresponding one of the first and second service brake outlets (in the illustrated embodiment, the second service brake outlet 1501) is configured as one of the fifth ports, which in the connected configuration is in fluid communication with the third service brake outlet 4001 via a flowpath 4010 formed in the valve block 4099 of the auxiliary module 4000. The respective fifth port 1501 is in fluid communication with the corresponding sixth port 4601 in the connected configuration, which in turn is in fluid communication with the third service brake outlet 4001 via the flowpath 4010.

Where the valve block 4099 of the auxiliary module is machined rather than cast, the flowpath 4010 connecting the third service brake outlet 4001 to the sixth port 4601 may similarly be formed by machining, so that the third service brake outlet can be arranged in any required location to suit the configuration of a particular vehicle.

The auxiliary module 4000 may include a parking brake sequence valve 4020 for selectively pressurising and depressurising the auxiliary supply outlet 4002 to control the parking brake actuators 71 responsive to a pressure signal from a solenoid actuated parking brake pilot valve 4021, which is controlled by an electrical parking brake actuation signal S5 received via an electrical connection 4006 from a user control of the vehicle 10. A pressure reducing valve 4022 may be provided to reduce the pressure supplied from the first pump 61 to the parking brake sequence valve 4020. A drain connection to tank 64 may be provided via corresponding fifth and sixth ports 1504, 4604 for depressurising the parking brake circuit 70.

The auxiliary module 4000 may further include a differential lock pressure reducing valve 4023 for reducing the pressure supplied from the first pump 61 to the differential lock circuit 80.

Port 4005 may be configured to connect a hydraulic accumulator 72 to the supply from the first pump 61 to the pressure reducing valve 4022.

Figure 10:
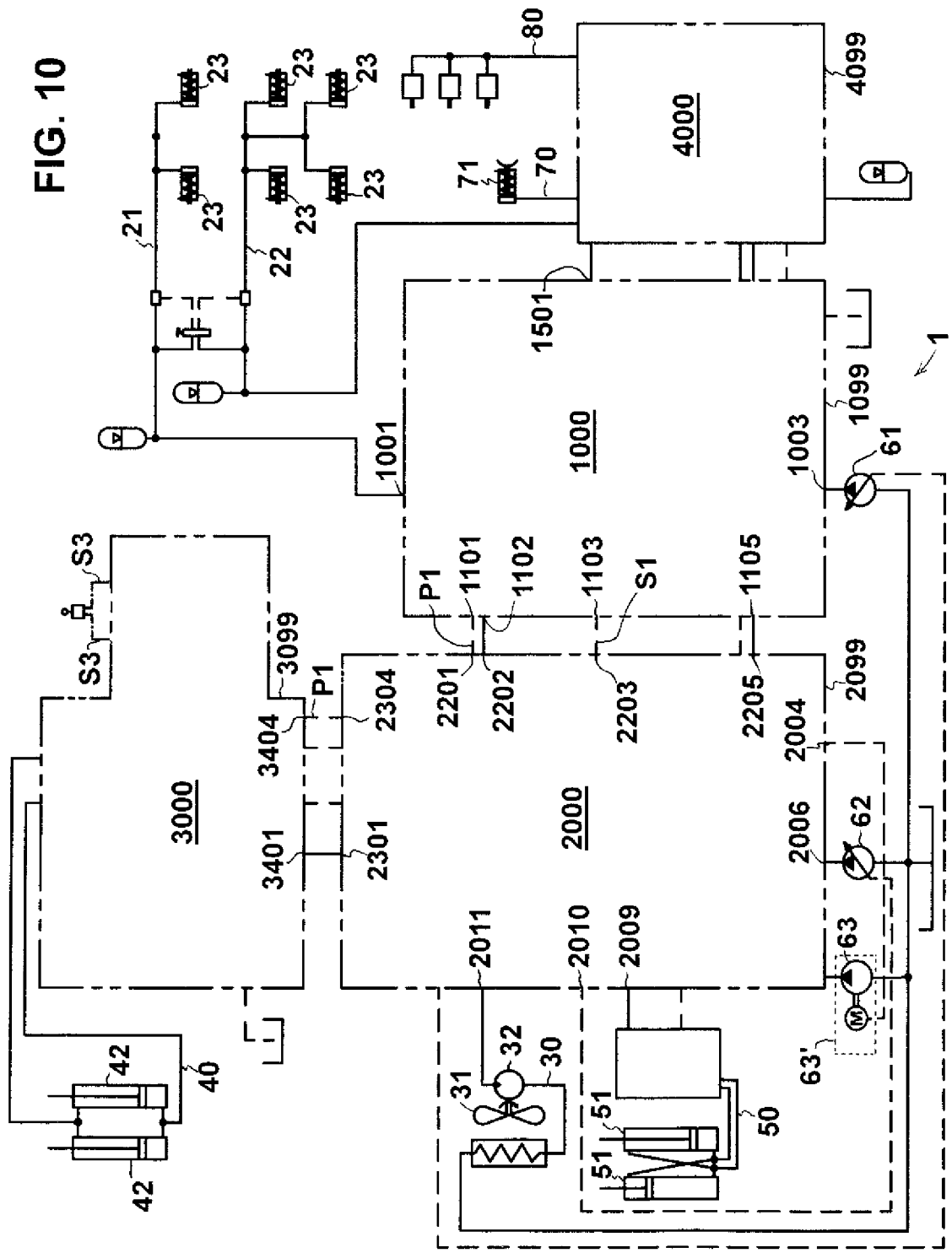
FIG. 10 shows a first alternative configuration of the valve assembly wherein the four modules are spaced apart and connected by hydraulic lines.

Referring now to FIG. 10, the respective modules of the valve assembly 1 may be separated at their respective interface surfaces and connected together in a distributed configuration.

Since each module is configured to service a particular functional hydraulic circuit or circuits of the vehicle, one or more of the modules can also be used in alternative configurations without the remaining one or ones of the modules. The unused ports on the exposed interface surface or surfaces may be closed by blanking plugs or the like (not shown). The valves included in each of the modules 1000 and 4000 may be selected and configured, e.g. as shown, so that the function of the respective module in supplying the respective hydraulic circuits that it serves is unimpaired when it is used on its own or with less than all of the other modules.

Figure 11:
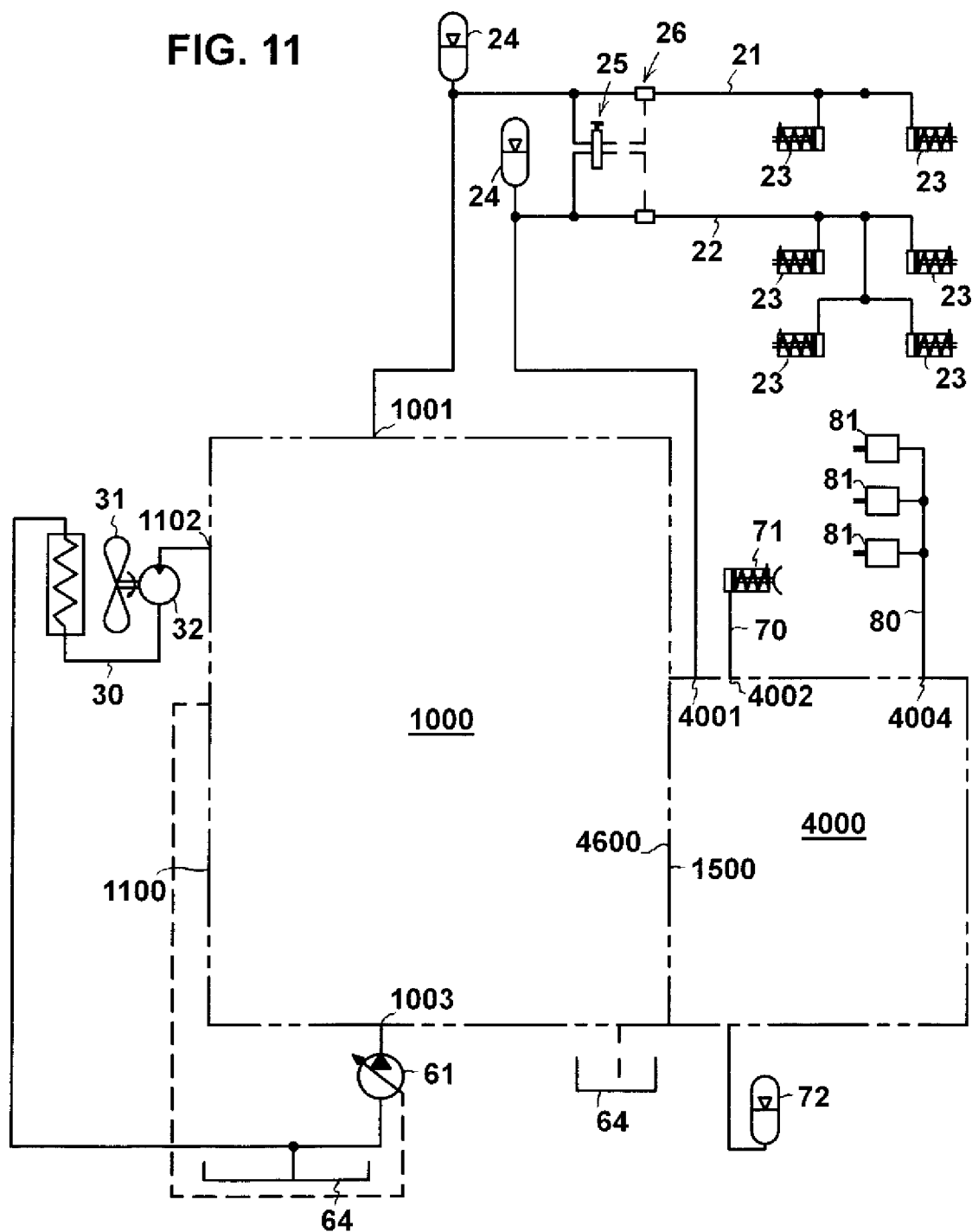
FIG. 11 shows a second alternative configuration wherein the fan and brake function module and the auxiliary module are installed together without the other modules.

FIG. 11 illustrates how the fan and brake function module 1000 and the auxiliary module 4000 can be used together to supply pressure from the first pump 61 to the fan, service brake, parking brake and differential lock circuits 30, 21, 22, 70, 80 of a vehicle that does not require a supply to a steering circuit or work function circuit. By configuring the complete valve assembly 1 as an assembly of functionally discrete modules, less complex vehicles can be fitted with selected ones of the modules, which simplifies assembly and reduces stockholding where more than one vehicle type is manufactured.

Figure 12:
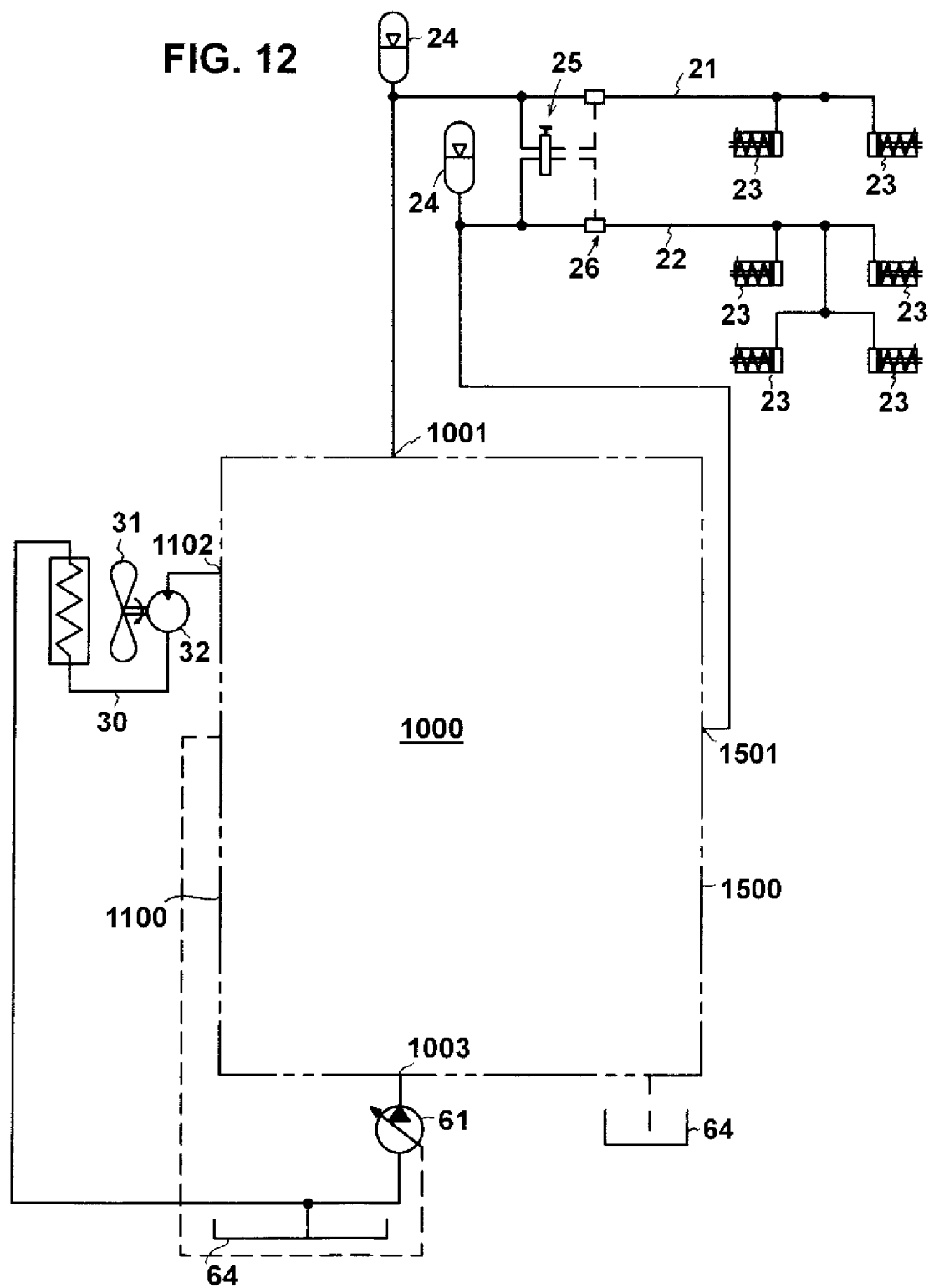
FIG. 12 shows a third alternative configuration wherein the fan and brake function module is installed on its own without the other modules.

FIG. 12 illustrates how the fan and brake function module 1000 can be used on its own to supply the fan circuit 30 and first and second service brake circuits 21, 22 of a vehicle that does not require a supply to steering, parking brake or differential lock circuits. Since module 4000 is not present in this configuration, interface surface 1500 provides room for the external hydraulic connection, and so the second service brake circuit 22 is connected directly to the second service brake outlet 1501 of interface surface 1500.

Referring finally to FIGS. 6-9, ports 3403, 2303, 2204, 1104, 1504, 4604 provide a drain connection to tank 64 via port 1002 in the fan and brake function module 1000. In configurations where less than all of the modules are used, the drain connection can be taken instead from one of the ports at the respective exposed interface surface.

Ports 2001, 2002, 2005, 4003 may be used for connection of pressure sensors. Various test ports 90 may be provided.

INDUSTRIAL APPLICABILITY

The novel valve assembly may be used, not only to replace the conventional main valve assembly in a work vehicle with a tipping body or other work equipment, but also in vehicles with different specifications requiring less than all of the modules. For example, the fan and brake function module 1000 may be used on its own or in combination with the auxiliary module 4000, with the first ports closed by suitable blanking plugs, to supply hydraulic pressure from the first pump inlet to the fan and service brake circuits, optionally also the parking brake and differential lock actuator circuits, of a vehicle that does not require the supply from the steering and work function module 2000.

The steering and work function module 2000 and work control module 3000 may similarly be separable so that if necessary, the work control module 3000 can be located elsewhere on the vehicle to suit the configuration of the work equipment of different vehicles, or can be omitted in case the valve assembly is to be installed on a vehicle that requires a hydraulic supply to its steering circuit but does not require a hydraulic supply to operate a tipping body or other work equipment.

At the same time, by providing the steering and work function module 2000 with a fan and brake function priority valve 2021 configured to receive a flow from the first pump 61 via the first and second interface surfaces 1100, 2200 when the modules 1000, 2000 are used in combination, wherein the combined flow from both first and second pumps 61, 62 is supplied to the work function outlet 2301, the novel valve assembly may provide optimal use of the pump capacity to supply work equipment that requires a combined flow when installed in a work vehicle with more than one pump.

Either or both of the fan and brake function module 1000 and the steering and work function module 2000 may comprise a respective, cast valve block 1099, 2099 for optimum hydraulic efficiency—which is to say, the fan and brake function module 1000 may comprise a unitary valve block 1099 with internal flowpaths formed by casting, and the steering and work function module 2000 may comprise another unitary valve block 2099 with internal flowpaths formed by casting. The control functions of each module 1000, 2000 may be performed by a plurality of valves, all of the valves being contained in or mounted on the respective, unitary valve block of the respective module.

In addition, where an auxiliary module 4000 is provided, the auxiliary module 4000 may comprise a machined valve block 4099, whose internal valve configuration and port layout may thus be adapted for the particular requirements of the vehicle 10 on which the valve assembly is to be fitted. In this way the novel valve assembly can provide the hydraulic efficiency of a cast valve block in combination with the adaptability of a machined valve block.

By forming a third service brake outlet configured as an external port 4001 for one of the service brake circuits on an exposed external face of the auxiliary module 4000, it is possible to space that port 4001 farther apart from the external service brake port 1001 of the other respective service brake circuit. Since the functional valve groups supplying the respective service brake circuit via the third service brake outlet 4001 are then arranged in a different one of the modules from the auxiliary module 4000 in which the third service brake outlet 4001 is formed, this makes possible a particularly compact connected configuration of the modules while still providing room for external hydraulic connections.

Where the third service brake outlet 4001 and its associated flowpath 4010 are formed by machining, the position of the external port 4001 can be adapted to the requirements of different vehicles without compromising the hydraulic efficiency of the valve block 1099 of the fan and brake function module 1000 containing the functional valve groups that supply it, which may be a cast valve block for optimal efficiency.

In summary, a hydraulic valve assembly 1 for a work vehicle 10 includes a fan and brake function module 1000 configured to supply hydraulic pressure from a first pump 61 to a fan circuit 30 and first and second service brake circuits 21, 22 of the vehicle, and a steering and work function module 2000 configured to receive hydraulic pressure from a second pump 62 and to supply hydraulic pressure to a steering circuit 50 and a work function circuit 40 of the vehicle. The assembly may further include a work control module 3000 and an auxiliary module 4000. The modules are separably connected together at respective interface surfaces 1100, 2200, 2300, 3400, 1500, 4600.

Many further adaptations are possible within the scope of the claims.

In the claims, reference numerals and characters are provided in parentheses, purely for ease of reference, and are not to be construed as limiting features.

What is claimed is:

1. A hydraulic valve assembly for use in a vehicle, the vehicle including:
   a plurality of wheels;
   a cooling fan;
   equipment for carrying out a work function of the vehicle, a plurality of hydraulic circuits; and
first and second hydraulic pumps for supplying hydraulic pressure to the hydraulic circuits, wherein:
the hydraulic circuits comprise:
first and second service brake circuits, wherein each service brake circuit comprises at least one respective service brake actuator for braking the wheels;
a fan circuit including a fan actuator for operating the cooling fan;
a steering circuit including at least one steering actuator for steering the wheels; and
a work function circuit including at least one equipment actuator for operating the equipment;
the valve assembly comprises:
a fan and brake function module configured to control a supply of hydraulic pressure to the fan circuit and the service brake circuits; and
a steering and work function module configured to control a supply of hydraulic pressure to the steering circuit and the work function circuit;
the fan and brake function module comprises:
a first pump inlet for receiving a supply of hydraulic pressure from the first pump;
first and second service brake outlets for supplying hydraulic pressure to the first and second service brake circuits; and
a fan supply outlet for supplying hydraulic pressure to the fan circuit;
the steering and work function module comprises:
a second pump inlet for receiving a supply of hydraulic pressure from the second pump;
a steering supply outlet for supplying hydraulic pressure to the steering circuit of the vehicle; and
a work function outlet for supplying hydraulic pressure to the work function circuit of the vehicle;
and wherein:
the fan and brake function module has a first interface surface and a plurality of first ports opening through the first interface surface;
the steering and work function module has a second interface surface and a plurality of second ports opening through the second interface surface; and
the fan and brake function module and the steering and work function module are separable at the first and second interface surfaces, and are connectable together at the first and second interface surfaces in a connected configuration in which each of the first ports is in fluid communication with a respective one of the second ports.

2. A hydraulic valve assembly according to claim 1, wherein the steering and work function module includes a steering function priority valve configured to restrict the supply of hydraulic pressure from the second pump to the work function outlet to maintain the supply of hydraulic pressure from the second pump to the steering supply outlet, responsive to increasing load on the steering circuit.

3. A hydraulic valve assembly according to claim 2, wherein:
the steering and work function module is configured to control a supply of hydraulic pressure from both of the first and second pumps to the work function outlet;
the steering and work function module includes a fan and brake function priority valve configured to restrict the supply of hydraulic pressure from the first pump to the work function outlet to maintain the supply of hydraulic pressure from the first pump to the first and second service brake outlets and the fan supply outlet, responsive to increasing load on any of the fan circuit and the first and second service brake circuits; and
the first and second ports include first and second work function supply ports configured in fluid communication in the connected configuration to convey the hydraulic pressure from the first pump inlet of the fan and brake function module to the fan and brake function priority valve of the steering and work function module.

4. A hydraulic valve assembly according to claim 3, wherein:
the fan and brake function module is configured to generate a first load sensing pressure signal indicative of variations in load on the fan circuit and the first and second service brake circuits;
the first and second ports include first and second load sensing pressure signal ports configured in fluid communication in the connected configuration to convey the first load sensing pressure signal from the fan and brake function module to the fan and brake function priority valve of the steering and work function module;
the fan and brake function priority valve being operable responsive to the first load sensing pressure signal to restrict the supply of hydraulic pressure from the first pump to the work function outlet to maintain the supply of hydraulic pressure from the first pump to the first and second service brake outlets and the fan supply outlet.

5. A hydraulic valve assembly according to claim 1, further including a work control module configured to control operation of the work function circuit, wherein
the steering and work function module includes a third interface surface and a plurality of third ports opening through the third interface surface;
the work control module has a fourth interface surface and a plurality of fourth ports opening through the fourth interface surface; and
the steering and work function module and the work control module are separable at the third and fourth interface surfaces and are connectable together at the third and fourth interface surfaces in a connected configuration in which each of the third ports is in fluid communication with a respective one of the fourth ports.

6. A hydraulic valve assembly according to claim 5, wherein:
the work control module includes a work function control valve assembly operable by a work function pilot pressure supply (P1) responsive to a work function control signal (S3) to control the operation of the at least one equipment actuator in the work function circuit; and
a flowpath is provided in the steering and work function module between the second interface surface and the third interface surface to convey the work function pilot pressure supply (P1) from the fan and brake function module to the work function control valve assembly of the work control module.

7. A hydraulic valve assembly according to claim 5, further including an auxiliary module configured to control a supply of hydraulic pressure to at least one further hydraulic circuit of the vehicle, wherein:
the fan and brake function module includes a fifth interface surface and a plurality of fifth ports opening through the fifth interface surface;
the auxiliary module includes:

at least one auxiliary supply outlet for supplying hydraulic pressure to the at least one further hydraulic circuit of the vehicle; and a sixth interface surface and a plurality of sixth ports opening through the sixth interface surface;

the auxiliary module and the fan and brake function module are separable at the fifth and sixth interface surfaces and are connectable together at the fifth and sixth interface surfaces in a connected configuration in which each of the fifth ports is in fluid communication with a respective one of the sixth ports; and the fan and brake function module are configured to supply pressure from the first pump inlet to the at least one auxiliary supply outlet via respective ones of the fifth and sixth ports in the connected configuration.

8. A hydraulic valve assembly according to claim 7, wherein both of the first and fifth interface surfaces are formed on a valve block of the fan and brake function module, and both of the second and third interface surfaces are formed on a valve block of the steering and work function module.

9. A hydraulic valve assembly according to claim 8, wherein the auxiliary module comprises a third service brake outlet for supplying hydraulic pressure to one of the first and second service brake circuits, and wherein one of the first and second service brake outlets is configured as one of the fifth ports being in fluid communication with the third service brake outlet in the connected configuration through a flowpath formed in a valve block of the auxiliary module.

10. A hydraulic valve assembly according to claim 8, wherein:

at least one of the valve block of the fan and brake function module and the valve block of the steering and work function module defines internal hydraulic flowpaths formed by casting; and the sixth interface surface is formed on a valve block of the auxiliary module, the valve block of the auxiliary module defining internal hydraulic flowpaths formed by machining and not by casting.

11. A hydraulic valve assembly according to claim 10, wherein:

the auxiliary module comprises a third service brake outlet for supplying hydraulic pressure to one of the first and second service brake circuits; and one of the first and second service brake outlets is configured as one of the fifth ports being in fluid communication with the third service brake outlet in the connected configuration, through a flowpath formed by machining in the valve block of the auxiliary module.

* * * * *